2,856,274

METHOD FOR PREPARING ANHYDROUS SODIUM BOROHYDRIDE

James B. Vetrano, Columbus, Ohio, and Robert W. Bragdon, Marblehead, Mass., assignors to Metal Hydrides Incorporated, Beverly, Mass.

No Drawing. Application April 28, 1955
Serial No. 504,676

3 Claims. (Cl. 23—300)

The present invention relates to the preparation of sodium borohydride and more particularly to an anhydrous sodium borohydride of high purity.

Sodium borohydride is produced on a commercial scale by reacting sodium hydride and methyl borate at a temperature between 200° C. and 275° C. The reaction mixture comprises essentially sodium borohydride and sodium methoxide. This reaction mixture is treated with a solvent for sodium borohydride which is a non-solvent for sodium methoxide such as isopropylamine. The solution is filtered to remove the sodium methoxide and the filtrate is evaporated to recover solid sodium borohydride.

The product produced usually contains not more than about 92.5 percent by weight of sodium borohydride. It has been found that only a small portion of the impurities is sodium methoxide. The remaining impurities are believed to be products formed by side reactions taking place during the main reaction between the sodium hydride and methyl borate. The removal of these impurities has presented a difficult problem. For many uses a product containing not less than 98 percent sodium borohydride is required.

A method for purifying sodium borohydride is described in the United States Patent No. 2,542,746. In accordance with this method a small amount of water is added to the solvent used for treating the reaction mixture of sodium borohydride and sodium methoxide to dissolve the sodium borohydride. The water reacts with some of the impurities to form an insoluble solid. While this method increases the purity of the product it does not produce a product having a sufficiently high purity for many uses.

It has been known that the purity of sodium borohydride can be increased somewhat by recrystallization from water to obtain crystals of sodium borohydride dihydrate ($NaBH_4 \cdot 2H_2O$). This method of purification does not produce the results desired and a substantial loss results since sodium borohydride is hydrolyzed rapidly in water. The dihydrate must be dehydrated by costly vacuum drying since the commercial form of sodium borohydride must be anhydrous.

We have discovered that sodium borohydride of a purity of 98 percent by weight or greater in anhydrous form can be obtained by crystallization from a water solution if the solution also contains a predetermined amount of sodium hydroxide. The presence of sodium hydroxide in the solution also reduces the loss of sodium borohydride due to hydrolysis to practically nil.

Thus, in accordance with the method of the present invention a solution of sodium borohydride in water is formed containing a predetermined concentration of sodium hydroxide. The solution is heated to a temperature substantially greater than a predetermined lower crystallization temperature and its sodium borohydride content is increased to an amount greater than that required to render the solution saturated at the predetermined crystallization temperature. The solution then is cooled to the predetermined crystallization temperature thereby causing crystals of anhydrous sodium borohydride to form. The crystals are separated from the mother liquor in any desired manner and washed with methanol or ethanol to remove the mother liquor absorbed on the surface of the crystals. The mother liquor contains some sodium borohydride and can be reused to obtain additional anhydrous sodium borohydride crystals as above described. When an objectionable amount of impurities have built up in the mother liquor by repeated reuse, the residual borohydride can be recovered in any desired manner.

The permissible minimum concentration of sodium hydroxide in the solution which can be used to obtain anhydrous crystals varies depending upon the temperature to which the solution is cooled for crystallization. A sodium hydroxide concentration of less than about 12 percent by weight at the predetermined crystallization temperature is not recommended. This is the minimum permissible concentration when the crystallization temperature is not less than about 25° C. The minimum permissible sodium hydroxide concentration at the crystallization temperature when the latter is 0° C. is 22 percent by weight. The minimum permissible sodium hydroxide concentration varies substantially proportionately from about 22 percent down to about 12 percent by weight at the predetermined crystallization temperature as the latter is increased from 0° C. up to 25° C. The maximum permissible sodium hydroxide concentration is about 45 percent by weight at the predetermined crystallization temperature. If a higher concentration is used some sodium hydroxide may crystallize with the sodium borohydride during the cooling step.

The upper temperature limit for desirable operation is about 80° C. Higher temperatures may be used but may result in loss of sodium borohydride by reaction with water. It is presently preferred to use an upper temperature of about 70° C. and a lower or crystallization temperature of about normal room temperature, that is, about 25° C. but not less than about 20° C., with a solution having a sodium hydroxide concentration of about 15 to 17 percent by weight at normal room temperature.

The product obtained by the method of the invention is an anhydrous sodium borohydride having a purity of 98 percent or more and consists of uniform compact crystals, generally about 400 microns in length, which pour well and have high bulk density. They are not particularly hygroscopic and have visual sales appeal.

The invention is illustrated further by the following specific example. 375 grams of 92.5 percent sodium borohydride was weighed into a 2-liter beaker. 375 grams of distilled water was added and the mixture stirred while heating to 55° C. All the sodium borohydride did not dissolve. After heating for 20 minutes at 55° C., the mixture was filtered through a coarse-porosity sintered glass disc by suction. A solution of 150 grams of sodium hydroxide pellets dissolved in 100 cc. distilled water at 70° C. was added to the filtrate. The mixture was then cooled to 25° C. with agitation in a stream of cool tap water. After 20 minutes at 25° C. the crystals which had formed were separated by means of a laboratory basket centrifuge. 52 grams of crystals were recovered and set aside. The mother liquor was used for the purification of four more batches. The second cycle is illustrative of the procedure used.

In the second cycle 60 grams of 92.5 percent sodium borohydride were added to the mother liquor and the mixture was heated to 60° C. with stirring for 30 minutes. The hot mixture was filtered and the filtrate cooled in a stream of tap water to 25° C. The crystals which formed were recovered by passing the mother liquor through the basket centrifuge. They weighed 48 grams. The succeeding three crops weighed 57 grams, 48 grams and 66 grams. The five crops were combined in a one-liter beaker and 400 cc. of denatured ethanol added to form a slurry. The slurry was then introduced into a basket centrifuge and the alcohol wash was separated from the crystals. The crystals were dried in a Stokes vacuum oven at room temperature for 16 hours. The dried crystals weighed 214.5 grams and were 98.5 percent pure. The mother liquor contained 29.6 percent sodium borohydride and 15.1 percent sodium hydroxide and was suitable for the purification of additional batches of impure sodium borohydride.

We claim:

1. The method for preparing substantially pure anhydrous sodium borohydride which comprises forming a solution comprising sodium borohydride and sodium hydroxide in water, heating the solution to an upper temperature not greater than about 80° C., increasing the sodium borohydride content of the solution while so heated to an amount greater than that required to render the solution saturated at a predetermined lower temperature, thereafter cooling the heated solution to said predetermined lower temperature thereby causing crystals of anhydrous sodium borohydride to form, and removing the crystals from the solution, said predetermined lower temperature being not less than 0° C., said solution having a minimum permissible sodium hydroxide concentration depending upon said predetermined lower temperature and varying substantially proportionately from about 22 down to 12 percent by weight at said predetermined lower temperature as the latter is increased from 0° C. to 25° C., the maximum permissible sodium hydroxide concentration in said solution being about 45 percent by weight at said predetermined lower temperature.

2. The method for preparing substantially pure anhydrous sodium borohydride which comprises forming a solution comprising sodium borohydride and sodium hydroxide in water, heating the solution to an upper temperature not greater than about 80° C., increasing the sodium borohydride content of the solution while so heated to an amount greater than that required to render the solution saturated at a predetermined lower temperature, thereafter cooling the heated solution to said predetermined lower temperature thereby causing crystals of anhydrous sodium borohydride to form, and removing the crystals from the solution, said predetermined lower temperature being not less than about 25° C., the sodium hydroxide content of said solution at said predetermined lower temperature being not less than 12 percent by weight and being not more than about 45 percent by weight.

3. The method for preparing substantially pure anhydrous sodium borohydride which comprises forming a solution comprising sodium borohydride and sodium hydroxide in water, heating the solution to an upper temperature not greater than about 80° C., increasing the sodium borohydride content of the solution while so heated to an amount greater than that required to render the solution saturated at a predetermined lower temperature, thereafter cooling the heated solution to said predetermined lower temperature thereby causing crystals of anhydrous sodium borohydride to form, and removing the crystals from the solution, said predetermined lower temperature being not less than about 20° C., the sodium hydroxide content of said solution at said predetermined temperature being between about 15 and 17 percent by weight.

References Cited in the file of this patent

Jensen: "A Study on Sodium Borohydride," 1954, pp. 19, 38–45.

Perry: "Chemical Engineers' Handbook," 3rd ed., 1950, pp. 1062–63.

Schlesinger et al.: "Journal of the American Chemical Society," vol. 75, page 207 (1953).

Schlesinger et al.: "Journal of the American Chemical Society," vol. 75, pages 200–201 (1953).

Marshal et al.: "Some Properties of Sodium Borohydride Solutions," AECD 2914, June 1950, page 6.